Figure 1:
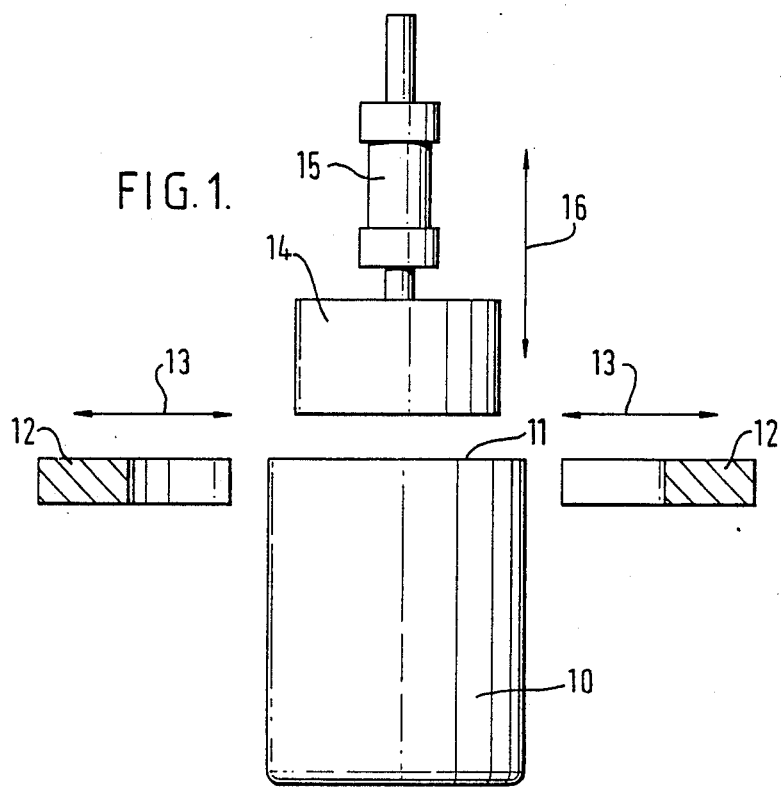

United States Patent [19]

Bock

[11] Patent Number: 4,896,415
[45] Date of Patent: Jan. 30, 1990

[54] METHODS FOR FORMING CONTAINERS

[76] Inventor: Erik Bock, Ejby Strandvej 3, DK-4070 Kr. Hyllinge, Denmark

[21] Appl. No.: 201,099

[22] Filed: May 31, 1988

Related U.S. Application Data

[63] Continuation of Ser. No. 879,990, Jun. 27, 1986, abandoned.

[30] Foreign Application Priority Data

Jun. 29, 1985 [GB] United Kingdom ............... 8516541
Feb. 25, 1986 [GB] United Kingdom ............... 8604661

[51] Int. Cl.⁴ ............... B29C 43/02; B29C 65/00; B65D 25/28; B65D 25/32
[52] U.S. Cl. ............... 29/453; 29/525; 220/91; 220/94 R; 264/296; 264/320; 264/534; 264/572
[58] Field of Search ............... 264/533, 296, 320, 322, 264/534, 572; 425/392, 393; 220/91, 94 R; 29/525, 453

[56] References Cited

U.S. PATENT DOCUMENTS

| | | |
|---|---|---|
| 2,230,560 | 2/1941 | Clark . |
| 2,901,144 | 8/1959 | Haustrup ............... 29/453 |
| 2,933,786 | 4/1960 | Peterson . |
| 3,048,889 | 8/1962 | Fischer et al. ............... 264/533 |
| 3,297,195 | 1/1967 | Hidding ............... 220/91 X |
| 3,358,877 | 12/1967 | Eckhoff ............... 29/453 X |
| 3,410,939 | 11/1968 | Driza et al. ............... 264/163 X |
| 3,524,241 | 8/1970 | Walkup et al. ............... 29/453 |
| 3,532,785 | 10/1970 | Johnson et al. ............... 264/163 X |
| 3,590,108 | 6/1971 | Startin et al. ............... 264/163 X |
| 3,631,584 | 1/1972 | Walkup et al. ............... 29/453 X |
| 3,649,150 | 3/1972 | Gilbert ............... 264/533 |
| 3,757,718 | 9/1973 | Johnson ............... 264/544 |
| 3,843,005 | 10/1974 | Uhlig ............... 264/534 |
| 3,899,279 | 8/1975 | Hudson et al. ............... 264/533 |
| 4,036,514 | 7/1977 | Hannover . |
| 4,036,926 | 7/1977 | Chang ............... 264/534 |
| 4,071,939 | 2/1978 | Bock ............... 29/453 X |
| 4,117,062 | 9/1978 | Uhlig, II ............... 264/534 |
| 4,143,453 | 3/1979 | Taluba ............... 264/296 |
| 4,158,692 | 6/1979 | Wilsson ............... 264/320 |
| 4,273,246 | 6/1981 | Thompson ............... 29/450 X |
| 4,324,755 | 4/1982 | Bommer ............... 264/296 X |
| 4,368,826 | 1/1983 | Thompson ............... 29/453 X |
| 4,372,737 | 2/1983 | Thompson ............... 425/393 |
| 4,412,966 | 11/1983 | Yoshino et al. ............... 264/533 |
| 4,497,758 | 2/1985 | Clark ............... 264/322 |
| 4,799,306 | 1/1989 | Collins et al. ............... 29/453 |

FOREIGN PATENT DOCUMENTS

| | | |
|---|---|---|
| 0133362 | 2/1985 | European Pat. Off. . |
| 0179199 | 4/1986 | European Pat. Off. . |
| 1181522 | 6/1959 | France . |
| 1311120 | 10/1962 | France . |
| 2369911 | 2/1978 | France . |
| 0111827 | 6/1984 | Japan . |
| 934975 | 8/1963 | United Kingdom . |
| 1048727 | 11/1966 | United Kingdom . |
| 1568369 | 5/1980 | United Kingdom . |

OTHER PUBLICATIONS

Patent Abstracts of Japan, vol. 8, No. 230 (M-333) (1667), Oct. 23, 1984 for Japanese 59-111827(A).

*Primary Examiner*—Jan H. Silbaugh
*Assistant Examiner*—Karen D. Kutach
*Attorney, Agent, or Firm*—Brady, O'Boyle & Gates

[57] ABSTRACT

A pre-formed (e.g. injection moulded) container body of flexible resilient plastics material is subjected to a subsequent cold-forming operation so that it is permanently deformed into a required configuration. For example, a desired container mouth configuration may be produced or handle-retaining recesses may be formed.

6 Claims, 6 Drawing Sheets

FIG. 4.
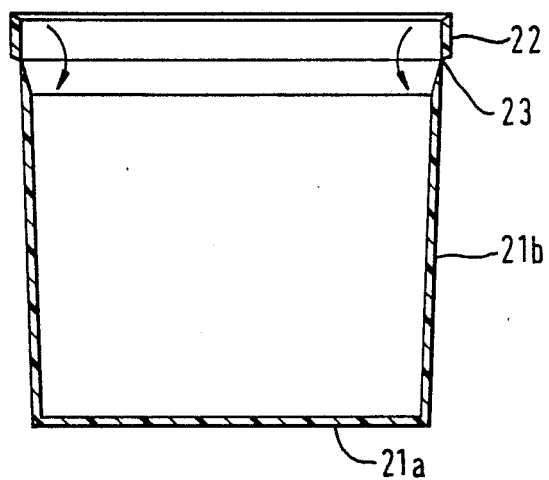
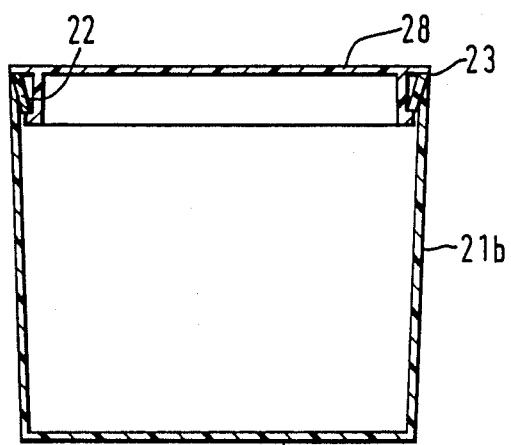
FIG. 5.

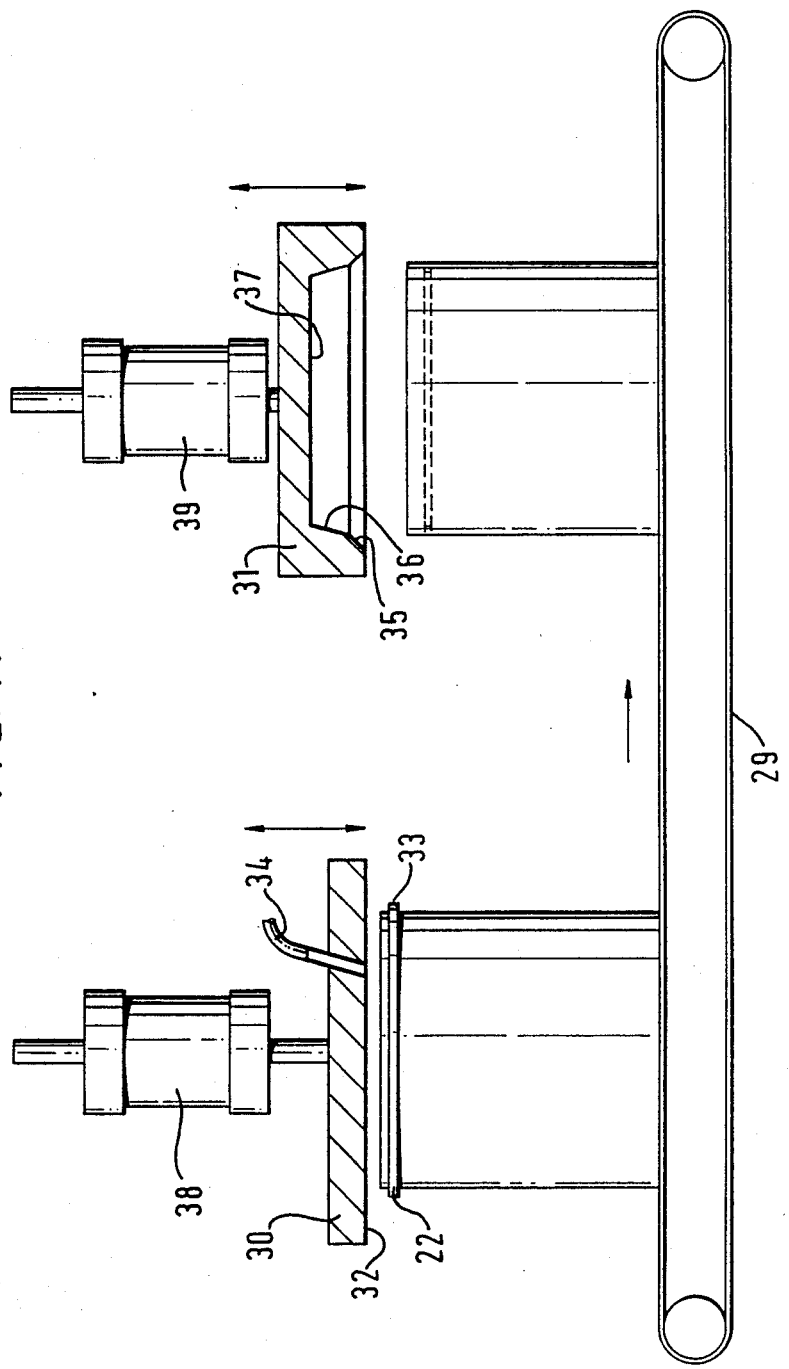

METHODS FOR FORMING CONTAINERS

This is a continuation of application Ser. No. 06/879,990 filed June 27, 1986, now abandoned.

This invention is concerned with methods and apparatus for forming containers.

Conventionally, container bodies made of flexible, resilient plastics material are formed in their required final shape in a single moulding operation, e.g. by injection moulding or blow moulding.

It is an object of the present invention to provide improved methods and apparatus for forming container bodies of flexible, resilient plastics material into or towards their required final shape.

The present invention provides a method of forming a container body in which a pre-formed (e.g. injection moulded) container body of flexible, resilient plastics material is formed into a desired configuration by pressure applied to said body to displace plastics material thereof into or towards said configuration.

Preferably, said pressure is applied and said displacement is effected at room temperature (i.e. without the application of heat to the container body). However, heat may be applied if desired, although it is normally unnecessary and may be technically and economically disadvantageous.

According to one aspect of the invention, there is provided a method of forming a container in which a pre-formed container body of flexible, resilient plastics material is subjected to a cold-forming operation in which the material is permanently deformed inwardly and/or outwardly at predetermined positions by pressure applied to the body.

In one form of the invention, the mouth of the pre-formed container body is squeezed inwardly to cause permanent deformation of the mouth and produce a smaller mouth aperture. The resulting shape of the container mouth may be similar to that obtainable by blow moulding. The inwards squeezing may be effected by outer jaws or dies or a flexible annular member moved radially inwards against the outside of the container mouth, a counter-pressure die of smaller cross-section than the original cross-section of the mouth being provided within said mouth and material of the mouth being forced against the counter-pressure die by the outer jaws or dies. Alternatively, the inwards squeezing may be effected by axial (endwise) movement of a compression tool against the mouth of the container, said tool having a cavity which receives the mouth and which is internally profiled to produce said inwards squeezing.

In another form of the invention, internal fluid pressure may be applied inside the container body to cause permanent outwards deformation of a predetermined part or parts thereof (e.g. the whole of the body below the mouth part) while outwards deformation of another part or parts (e.g. the mouth part) is prevented by external constraint. Again, a container mouth may be produced having a shape similar to that obtainable by blow moulding.

My European Patent Application No. 84305189.7 (Publication No. 0133362) describes a plastics container having a side wall and a rim portion formed in one piece with the side wall and joined thereto by an integral hinge portion on which the rim portion can be folded inwardly of the container. When the side wall and rim portion are inwardly concave (e.g. when the container is of circular cross-section), after inwards folding of the rim portion, the rim portion is held firmly in the inwards position by opposing forces in the rim portion and side wall caused by folding. Since the plastics material of which the container is made is necessarily flexible and resilient, the force exerted by the inwardly folded rim portion on the side wall causes the latter to bulge or flare outwardly in the region adjacent to the rim portion. This trumpet-shaped bulging may be undesirable for aesthetic and practical reasons.

To remove or reduce this bulging, in another form of the present invention, the mouth of a preformed container having an inwardly-folded rim portion causing an external bulge is compressed radially inwards to cause permanent deformation of the plastics material adjacent the mouth. The compression may be effected by outer jaws or dies or a flexible annular member moved radially inwards but is preferably effected by a compression tool as hereinbefore mentioned.

In yet another form of the invention, there is provided a method of folding inwardly a hinged rim portion of a container as hereinbefore referred to. The method comprises moving a folding member axially (endwise) against the rim portion so as to force it radially inwards. The folding member may be similar to the aforesaid compression member but with a suitable internal profile to cause folding. The internal profile may be provided by a concave (possibly only slightly concave) surface on the underside of the folding tool. However, it has surprisingly been found that the folding member may have a flat surface for engagement with the rim portion. In that case, it is desirable to reduce risk of collapse of the container side wall under the pressure of the folding member by supporting the side wall externally and/or internally during the folding operation. A preferred method of support is to supply compressed air to the interior of the container, which is of course sealed by the flat surface of the folding member.

Larger plastics containers such as buckets need handles to carry them. These handles are mainly manufactured from steel wire or plastics. To hold the handle, the plastics container is normally moulded with handle lugs, projecting from the outer surface. This design causes complication in the mould resulting in lower production speed and higher capital cost, and also complicates decoration of the container—both printing and labelling wise.

A design maintaining a smooth outer surface of the container by recessing the handle lugs into the surface, is known. However, this design requires a split or collapsible core of the mould, which is very costly and slows down the production speed.

When using a resilient plastics such as polypropylene or like material, it is, according to the invention, possible to cold form handle lugs on the container after having ejected the container from the mould. By this post-moulding operation it is possible to increase moulding speed and hence obtain better utilization of the large investments in moulding machines and moulds.

One system for achieving these advantages, comprises a pneumatically activated piston movable concentrically into a die, preferable with a spring loaded bottom. The diameter of the die is slightly bigger than the diameter of the piston. The difference in diameter determines the wall thickness of the intrusion, i.e. the lug. The wall thickness of the bottom of the intrusion may be controlled by adjusting the force of the spring. If a thinner bottom of the intrusion is acceptable, more material is available for the side wall of the intrusion and the intrusion can be made deeper.

An enlarged head on pivotal projections on the handle may expand the walls of the intrusions inside the side wall of the container, if the walls of the intrusions have a sufficiently thin wall thickness. This will "catch" the handle and make the fixture sufficient for normal use. If, however, one needs to take off the handle to change the label, it is still possible to pull the handle off the container and to replace it, when needed.

The above-mentioned forms of the invention are all preferably carried out at room temperature and thus usually involve cold forming of the container body. However, as previously mentioned, the use of higher temperatures is not necessarily excluded from the scope of the invention.

Figure 2:
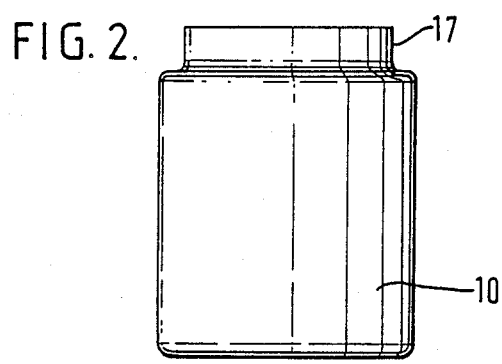
Figure 3:
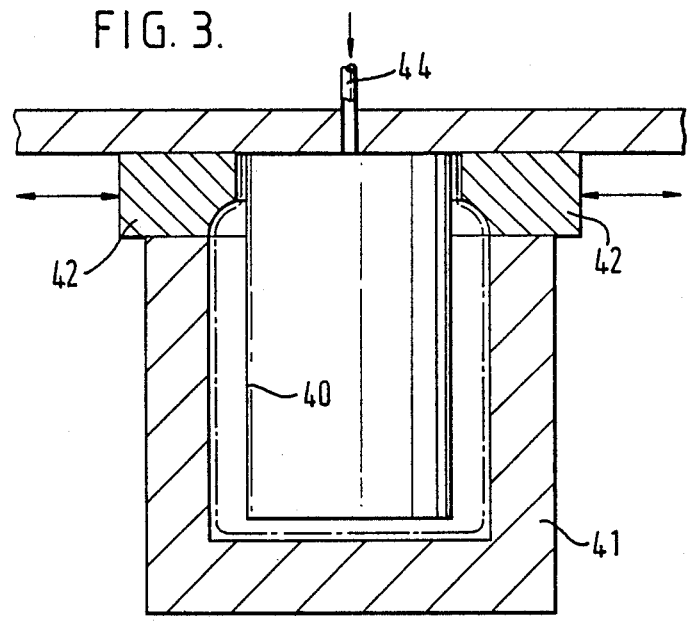
Figure 6:
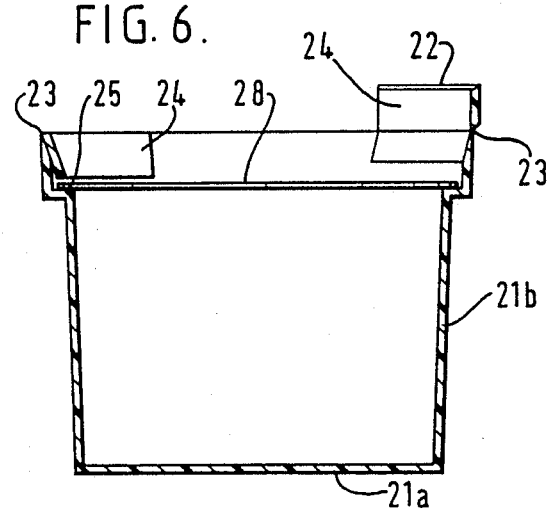
Figure 8:
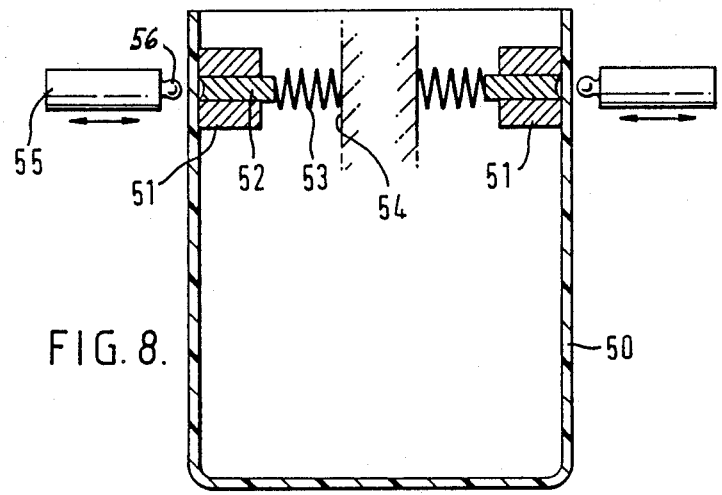
Figure 11:
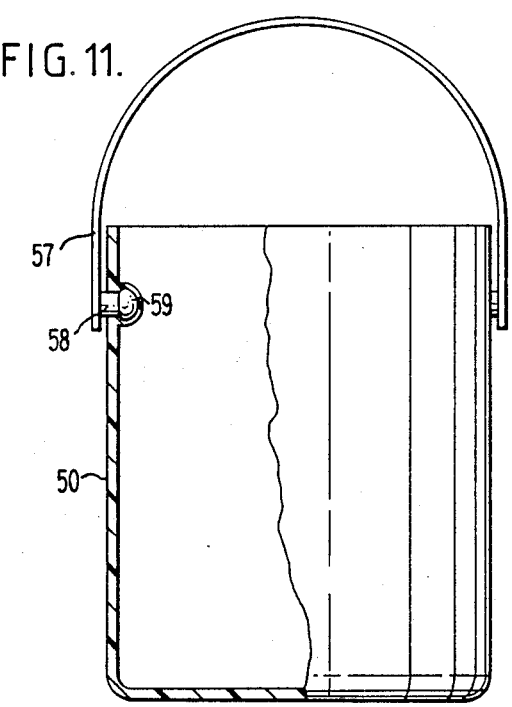
Figure 9:
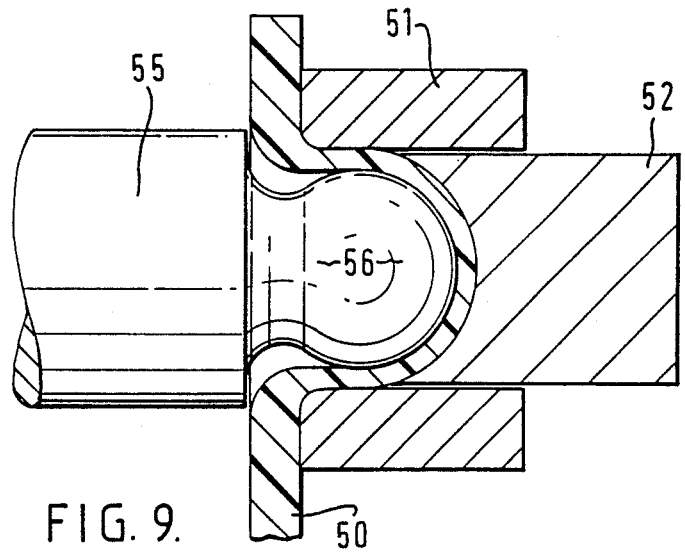
Figure 10:
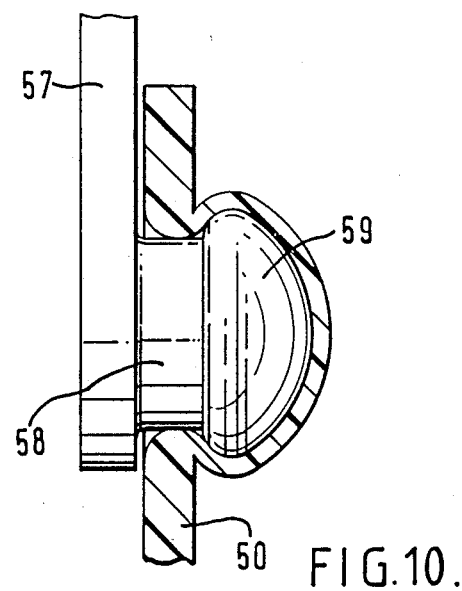

The following is a description, by way of example, of embodiments of the invention, reference being made to the accompanying schematic drawings, in which FIG. 1 shows apparatus for forming a mouth similar to that obtainable by blow moulding, FIG. 2 shows a container with a mouth formed by the apparatus of FIG. 1, FIG. 3 shows in cross-section another apparatus for forming a mouth similar to that obtainable by blow moulding, FIG. 4 is a sectional elevation of a container as moulded, FIG. 5 is a sectional elevation of the container of FIG. 4 with the rim portion folded inwardly and a lid applied, FIG. 6 is a sectional elevation of another form of container, FIG. 7 is a view, partly in section, of apparatus for forming container mouths with folded rims, FIG. 8 is a sectional side view of apparatus for post forming handle-receiving recesses in a plastics container, FIG. 9 is a view on a larger scale of parts shown in FIG. 8 after formation of a recess, FIG. 10 is a view on a larger scale of a pivotal projection on a handle received in a recess, and FIG. 11 is a part-sectional view showing a container with a handle fitted.

In all of the embodiments, the container is made of flexible, resilient plastics material, e.g. polypropylene.

FIG. 1 shows a pre-formed (e.g. injection moulded) container 10 having an open top 11. Trimming jaws or dies 12 can be moved radially inwards and outwards in the directions indicated by arrows 13 to engage and disengage with outside of the mouth of the container. A container-pressure die 14 can be moved by a pneumatic cylinder 15 up and down in the directions indicated by arrows 16 into and out of the mouth of the container. The counter-pressure die is of smaller diameter than that of the container mouth. To form the desired shape of the container mouth, the counter-pressure die 14 is moved down into the container mouth and the jaws 12 are moved radially inwards to force the material of the container mouth against the counter-pressure die. The mouth is thereby permanently deformed to provide a smaller aperture and thus achieves a shape 17 (see FIG. 2) similar to that obtainable in a blow-moulded container.

To ensure continuous inwards pressure around the whole periphery of the container mouth, joints of elastomeric material, e.g. silicone rubber, may be provided between the jaws 12. The jaws 12 may desirably overlap one another in iris diaphragm fashion to ensure that pressure is applied round the entire periphery of the container. Instead of the jaws, an annular tube of elastomeric material may be provided around the mouth of the container and pressurised fluid (e.g. compressed air) may be forced into the tube to cause it to squeeze the mouth of the container inwards.

FIG. 3 shows another arrangement for forming the container mouth to produce a shape as in FIG. 2. A pre-formed container 40 is placed in a mould 41 having inwardly and outwardly movable upper parts 42 internally profiled in accordance with the desired final shape of the container mouth. A top plate is applied through which compressed air is applied through pipe 44 to expand the container body below the mouth part against the mould 41 which has a diameter greater than the original diameter of the pre-formed container. Instead of, or in addition to, forming the container mouth in this way, other parts of the container (e.g. the bottom part or annular recesses or protrusions at positions between the top and bottom of the container) may be formed in similar fashion by suitably constructing the mould. Such forming may be effected after printing on the outside of the original pre-formed container body.

The containers of FIGS. 4, 5 and 6 are examples of those described in my European Patent Application No. 84305189.7. Each container is formed with a base 21a, a side wall 21b, a rim portion 22 and a hinge portion 23 all injection-moulded in one piece from plastics. As shown, the container is of circular cross-section, but other cross-sections may be used. Preferably, the plastics is polypropylene but other flexible, resilient plastics such as is used for moulded containers may be employed. The hinge portion 23 is substantially thinner than the side wall 21b and the rim portion 22.

The container of FIG. 4 is shown in its form as moulded. After moulding, the rim 22 is folded inwardly and downwardly in the direction of the arrows into the position of FIG. 5 and remains held securely in this position as a result of the forces caused by the folding operation. The same general principle is used in the container of FIG. 6. FIG. 5 shows a lid 28 applied to the container. The rim portion 22 and hinge portion 23 of FIGS. 4 and 5 extend continuously for the whole way round the container.

The container of FIG. 6 has a plurality of rim portions 22 in the form of segments 24 spaced apart round the container. The right-hand side of FIG. 6 shows a segment 24 in its position as moulded while the left-hand side shows a segment 24 in folded position. The inside of the side wall 21b is formed with an annular recess having an upwardly directed face 25 on which bears a lid 28 which, in the simplest form, may consist of a disc of cardboard. The lid is applied before folding in the segments 24 which, when folded in, act as a lock for the lid.

FIG. 7 shows a conveyor belt 29 on which containers as shown in FIGS. 4 to 6 are carried beneath a folding tool 30 and a compression tool 31. Folding tool 30 has a flat (and, preferably,, polished) undersurface 32. When the undersurface 32 is pressed down on to the upper edge of a rim portion 22, a torque is created between the line of pressure and the hinge portion 23, tending to fold the rim portion inwards, since the hinge line runs along the outer surface of the container. The rim portion slides inwards on the undersurface 32, the leverage increases and, when the rim portion has been pushed down sufficiently, the rim portion passes a point of balance and moves on of its own accord (by "snap" action) until it rests firmly against the inside of the container. As shown in FIG. 7, the rim portion differs slightly from that of FIGS. 4-6 by having a rib 33. As the tool 30 moves down, pressure moves from the upper edge of the rim portion to the edge of the rib 33 and, when the edge of the rib has been pressed down to the level of the hinge line, the rim portion will move on of its own accord as hereinbefore described.

As long as the container side wall stays in shape when exposed to the vertical force of the tool 30, it is strong enough to support the pressure. However, if the side wall starts to lose shape, it becomes weak. (When a round container loses shape, part of the periphery will move inwards and part outwards to keep the peripheral distance the same length). To avoid such loss of shape, it may be necessary to provide internal and/or external support for the side wall. On a production line, it is inconvenient to support the side wall from outside and a solid support on the inside would be difficult to remove after folding the rim portion. Preferably, therefore, internal support is provided by supplying compressed air (or other gas) from a pipe 34 through the tool 30 into the interior of the container. Air pressure of about one atmosphere above atmospheric pressure has been found to be suitable. The internal pressure does not prevent inwards folding of the rim portion since it is a low pressure acting on the rim portion over a small area, compared with the vertical force (e.g. 500–1000 kp) applied by the tool 30. After folding of the rim portion, the tool 30 is moved upwards clear of the container. The container is then moved by the conveyor 29 to a position beneath the compression tool 31. The tool 31 has a circular cavity opening through its base and defined by a first frusto-conical wall 35, a second frusto-conical wall 36 at a greater angle to the base, and a flat end wall 37. The tool 31 is forced down on to the container, which is centered by the wall 35 before the wall 36 engages the top part of the container side wall, where it has been slightly bulged out by the pressure of the folded rim portion, and compresses the top part radially inwards to an extent sufficient to cause permanent removal of the bulge. The diameter of the end wall 37 is critical because it determines the maximum compression when the rim is forced as far as possible into the cavity. The tool 31 is then moved up clear of the container. The tools 30 and 31 may be moved up and down by means of pneumatic cylinders 38, 39.

A removable core or plunger may if necessary be provided to ensure removal of the containers from the tool 31 but may not be required if the tool cavity is suitably profiled. For example, if the wall 36 is at a suitable angle (e.g. 15° to the vertical), the container may be self-releasing when the tool is raised. Internal air pressure is not required with tool 31.

For folding some forms of folding rim, it may be desirable to use a compression tool having a suitable profiled cavity instead of a flat tool. A compression tool having a suitable profiled cavity may also be used to form a mouth similar to a blow-moulded mouth.

In FIG. 8, a pre-formed plastics container body 50 is shown with two dies 51 positioned internally at diametrically opposite positions. Each die 51 has a through bore in which is reciprocably disposed a plunger 52 biassed outwardly by a spring 53 to provide a spring-loaded bottom for the die. The springs 53 have adjustable supports 54 so that the resistance to movement of the plungers 52 can be adjusted. Outside the container body are two pneumatically actuated pistons 55 having convex projections 56 which cooperate with concave recesses in the outer ends of plungers 52. In use, the pistons are forced inwardly so that the projections 56 deform the side wall of the container body under the constraint imposed by the plungers 52. FIG. 9 shows a piston 55 at the end of its inwards movement. The pistons are there after retracted. The recesses thus formed in the container side wall have a wall thickness less than the thickness of the container side walls, as shown in FIGS. 9, 10, and 11. A handle 57 is formed at each end with a pivotal projection 58 having an enlarged head 59. As shown in FIGS. 10 and 11 each enlarged head 59 has a diameter greater than the diameter of each recess. Each projection 58 fits with a "snap" action into its recess, each recess then assuming the contour shown in FIG. 10 of the enlarged head 59, and the projection 58 being removably retained therein by its enlarged head 59. Owing to the resilience of the material forming the recess, the projection 58 can be removed by the application of moderate force.

It will be appreciated that in the various cold-forming processes described above, the forming pressure should be applied for at least a minimum period of time to ensure the desired permanent deformation of the plastics material. Such period of time is of course readily determined by practical experiment.

I claim:

1. A method of applying a handle-like member to a preformed container body of flexible, resilient plastics material having opposite side walls, comprising positioning a pair of dies having bores therein internally of said container at substantially diametrically opposite positions on said side walls, and a pair of pistons outside said side walls in alignment with said bores of said dies, displacing said plastics material of said side walls into said bores by subjecting said side walls to cold-forming by applying pressure thereto by moving said pistons against said side walls and into said bores, forming oppositely disposed inwardly extending hollow recesses, adapted to receive projections on substantially opposite ends of a handle-like member, and said projections adapted to be forced into said hollow recesses causing said hollow recesses to assume the contour of said projections, forming said handle-like member having said projections on said substantially opposite ends, and forcing said projections into said hollow recesses causing said hollow recesses to assume the contour of said projections, and causing said handle-like member to become attached to said pre-formed container body.

2. A method as set forth in claim 1 wherein said bores of said pair of dies are positioned at substantially right angles to said side walls.

3. A method as said forth in claim 1 in which during the displacing step said inwardly extending hollow recesses are formed with wall thicknesses less than the thickness of said container side walls whereby said hollow recesses can assume said contour of said projections.

4. A method as set forth in claim 1 in which said pair of pistons have convex projections thereon moveable against said side walls and into said bores.

5. A method as set forth in claim 1 in which said projections are forced by snap action into said hollow recesses.

6. A method as set forth in claim 1 in which each projection includes an enlarged head portion having a diameter greater than the diameter of each recess.

* * * * *